(12) United States Patent
Nemoto et al.

(10) Patent No.: US 9,632,394 B2
(45) Date of Patent: Apr. 25, 2017

(54) IMAGE PICKUP DEVICE AND FOCAL PLANE SHUTTER

(71) Applicant: SEIKO PRECISION INC., Narashino-shi (JP)

(72) Inventors: Chiaki Nemoto, Narashino (JP); Hiroshi Takahashi, Narashino (JP); Shoichi Tokura, Narashino (JP); Yoichi Nakano, Narashino (JP); Motoharu Sakurai, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 14/795,099

(22) Filed: Jul. 9, 2015

(65) Prior Publication Data

US 2015/0309387 A1    Oct. 29, 2015

Related U.S. Application Data

(63) Continuation of application No. PCT/JP2013/078205, filed on Oct. 17, 2013.

(30) Foreign Application Priority Data

Jan. 31, 2013  (JP) .................... 2013-017526

(51) Int. Cl.
  *G03B 9/14* (2006.01)
  *G03B 9/58* (2006.01)
  (Continued)

(52) U.S. Cl.
  CPC ........... *G03B 9/14* (2013.01); *G03B 9/08* (2013.01); *G03B 9/58* (2013.01); *G03B 9/42* (2013.01);
  (Continued)

(58) Field of Classification Search
  None
  See application file for complete search history.

(56) References Cited

U.S. PATENT DOCUMENTS 5,659,821 A     8/1997   Kawakita
6,477,328 B1 *  11/2002  Oishi ............... G03B 7/097
                                                 396/213

(Continued)

FOREIGN PATENT DOCUMENTS

JP    H06-148718      5/1994
JP    H10-206926 A    8/1998
(Continued)

OTHER PUBLICATIONS

International Search Report for International Application No. PCT/JP2013/078205 dated Jan. 21, 2014.

(Continued)

*Primary Examiner* — Justin P Misleh
(74) *Attorney, Agent, or Firm* — Kratz, Quintos & Hanson, LLP

(57) ABSTRACT

An image pickup device includes: a focal plane shutter including: a board including an opening; a shutter moving to open and close the opening; an actuator moving the shutter; and a detection portion detecting that the shutter passes through a predetermined position, an image pickup element which light enters through the opening; and a drive control portion that controls the actuator to move the shutter, wherein the drive control portion performs movement control to move the shutter at least until the shutter passes through the predetermined position, and performs brake control to decelerate the shutter while the shutter is moving after the shutter passes through the predetermined position.

8 Claims, 13 Drawing Sheets

(51) Int. Cl.
*G03B 9/08* (2006.01)
*H04N 5/238* (2006.01)
*G03B 9/42* (2006.01)

(52) U.S. Cl.
CPC ...... *G03B 2205/0053* (2013.01); *H04N 5/238* (2013.01)

(56) References Cited

U.S. PATENT DOCUMENTS

| | | | |
|---|---|---|---|
| 6,491,450 B1* | 12/2002 | Mizukami | G03B 7/00 396/236 |
| 2004/0047626 A1 | 3/2004 | Miyazaki | |
| 2004/0223076 A1* | 11/2004 | Nakano | G03B 9/18 348/363 |
| 2004/0223756 A1 | 11/2004 | Nakano | |
| 2005/0063698 A1* | 3/2005 | Usuda | G03B 9/40 396/489 |
| 2011/0123186 A1* | 5/2011 | Tsai | G03B 7/00 396/213 |
| 2012/0249849 A1* | 10/2012 | Nakano | H04N 5/3532 348/296 |

FOREIGN PATENT DOCUMENTS

| | | |
|---|---|---|
| JP | 2002-214671 A | 7/2002 |
| JP | 2004-101860 A1 | 4/2004 |
| JP | 2004-317590 A1 | 11/2004 |
| JP | 2004-317666 A1 | 11/2004 |

OTHER PUBLICATIONS

Office Action issued on Jul. 26, 2016 in the corresponding Japanese patent application No. 2013-017526; English translation.
Notification of Reasons for Refusal issued on Dec. 6, 2016 in the counterpart Japanese patent application No. 2013-017526, with English translation.

* cited by examiner

IMAGE PICKUP DEVICE AND FOCAL PLANE SHUTTER

CROSS-REFERENCE TO RELATED APPLICATION

This application is a continuation of and claims priority to International Patent Application No. PCT/JP2013/078205 filed on Oct. 17, 2013, which claims priority to Japanese Patent Application No. 2013-017526 filed on Jan. 31, 2013, subject matter of these patent documents is incorporated by reference herein in its entirety.

BACKGROUND (i) Technical Field

The present invention relates to image pickup devices and focal plane shutters.

(ii) Related Art

There is known a focal plane shutter employed in an image pickup device. The focal plane shutter in Japanese Unexamined Patent Application Publication No. 2004-101860 opens and closes an opening of a board by a shutter moved by an actuator.

For example, the shutter abuts a positioning provided in the board, or a drive lever that transmits the drive force of the actuator abuts a part of the board, so that the stop position of the shutter is defined. For this reason, the moving shutter stops, after a predetermined period elapses from when the shutter or the drive lever abuts the board and bounds. The large bounce of such a shutter might cause several problems.

SUMMARY

According to an aspect of the present invention, there is provided an image pickup device including: a focal plane shutter including: a board including an opening; a shutter moving to open and close the opening; an actuator moving the shutter; and a detection portion detecting that the shutter passes through a predetermined position, an image pickup element which light enters through the opening; and a drive control portion that controls the actuator to move the shutter, wherein the drive control portion performs movement control to move the shutter at least until the shutter passes through the predetermined position, and performs brake control to decelerate the shutter while the shutter is moving after the shutter passes through the predetermined position.

DETAILED DESCRIPTION

Figure 1:
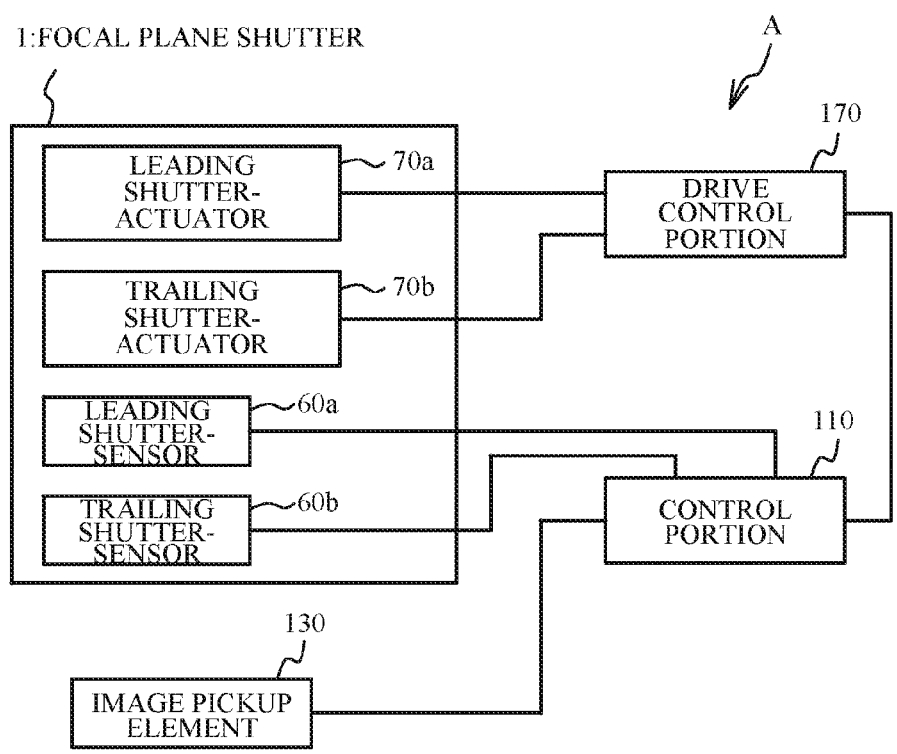
FIG. 1 is a block diagram of a camera including a focal plane shutter.

FIG. 1 is a block diagram of a camera (image pickup device) A including a focal plane shutter 1. The camera A includes the focal plane shutter 1, a control portion 110, an image pickup element 130, and a drive control portion 170. The focal plane shutter 1 includes a leading shutter-actuator (hereinafter, referred to as actuator) 70a, a trailing-shutter actuator (hereinafter, referred to as actuator) 70b, a leading-shutter sensor (hereinafter, referred as sensor) 60a, and a trailing-shutter sensor (hereinafter, referred as sensor) 60b, as will be described later in detail.

The drive control portion 170 controls the drive of the actuators 70a and 70b in accordance with the instruction from the control portion 110. The drive control portion 170 includes a CPU. The control portion 110 instructs the drive control portion 170 in accordance with the signals from the sensors 60a and 60b, as will be described later in detail. In response to this instruction, the drive control portion 170 controls the drive of the actuators 70a and 70b. The control portion 110 controls the operation of the whole camera, and includes the CPU, a ROM, and a RAM. The image pickup element 130 is a CMOS. The image pickup element 130 is a light receiving element that converts subject images into electric signals on the basis of photoelectric conversion. Moreover, the camera A includes lenses, not illustrated in FIG. 1, for adjusting a focal length.

Figure 2:
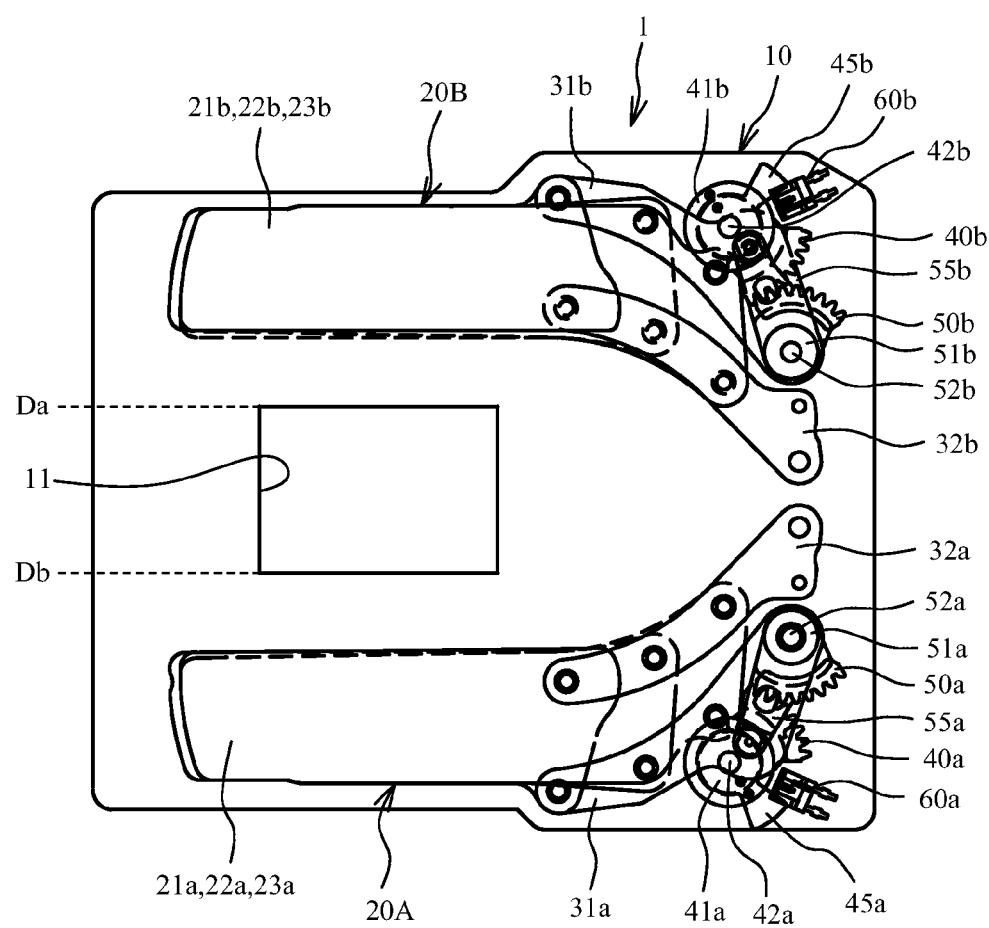
FIG. 2 is a front view of the focal plane shutter.

FIG. 2 is a front view of the focal plane shutter 1. In FIG. 2, the actuators 70a and 70b are omitted. The focal plane shutter 1 includes a board 10, a leading shutter 20A, a trailing shutter 20B, arms 31a, 32a, 31b, and 32b, and the actuators 70a and 70b. The board 10 is provided with a rectangular opening 11. FIG. 2 illustrates an imaging surface of the image pickup element 130 within the opening 11.

The leading shutter 20A includes three blades 21a to 23a. The trailing shutter 20B includes three blades 21b to 23b. FIG. 2 illustrates the leading shutter 20A and the trailing shutter 20B in overlapped states. In FIG. 2, the leading shutter 20A and the trailing shutter 20B recedes from the opening 11. The leading shutter 20A is connected to the arms 31a and 32a. The trailing shutter 20B is connected to the arms 31b and 32b. These arms 31a, 32a, 31b, 32b are rotatably supported by the board 10.

The board 10 is provided with a leading-shutter drive lever 55a (hereinafter, referred to as drive lever) and a trailing-shutter drive lever 55b (hereinafter, referred to as drive lever) for driving the arms 31a and 31b, respectively. The drive levers 55a and 55b are connected with gears 50a and 50b, respectively. The gears 50a and 50b engage gears 40a and 40b, respectively. The gears 40a, 40b, 50a, and 50b include pipe portions 41a, 41b, 51a, and 51b respectively, and are rotatably supported around spindles 42a, 42b, 52a, and 52b fitting into the pipe portions by the board 10, respectively. Additionally, the spindles 42a, 42b, 52a, and 52b do not have to be always formed on the board 10 in which the opening 11 is formed, and have only to be positionally fixed with respect to the opening 11.

The gears 40*a* and 40*b* are connected with rotors of the actuators 70*a* and 70*b*, respectively. The driving of the actuator 70*a* drives the gears 40*a* and 50*a*, thereby driving the drive lever 55*a*. The driving of the drive lever 55*a* drives the arm 31*a*. Thus, the leading shutter 20A moves. The leading shutter 20A is movable between a receded position where the leading shutter 20A recedes from the opening 11 and a closed position where the leading shutter 20A closes the opening 11. The leading shutter 20A is moved between the receded position and the closed position by the actuator 70*a*. The gears 40*b* and 50*b*, the drive lever 55*b*, and the trailing shutter 20B each has the similar configuration.

The gears 40*a* and 40*b* are provided with thin plates 45*a* and 45*b*, respectively. The thin plates 45*a* and 45*b* rotate together with the gears 40*a* and 40*b*, respectively. The thin plates 45*a* and 45*b* each has a fan shape. The sensors 60*a* and 60*b*, will be described in detail, are provided on the board 10. The sensors 60*a* and 60*b* are examples of respective first and second detection portions.

Also, the arms 31*a* and 31*b* are connected with respective springs, not illustrated. Specifically, one end of a spring is connected with the arm 31*a*, and the other end is connected with the board 10. One end of the other spring is connected with the arm 31*b*, and the other end is connected with the board 10. These springs bias the arms 31*a* and 31*b* to move the leading shutter 20A and the trailing shutter 20B away from the opening 11, respectively.

Figure 3A:
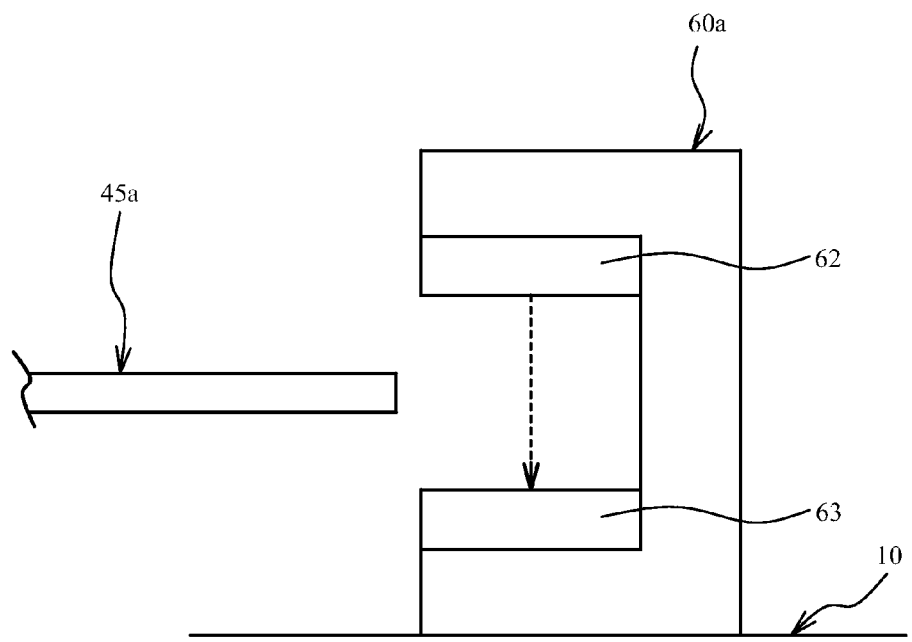
FIGS. 3A and 3B are explanatory views of a sensor.
Figure 3B:
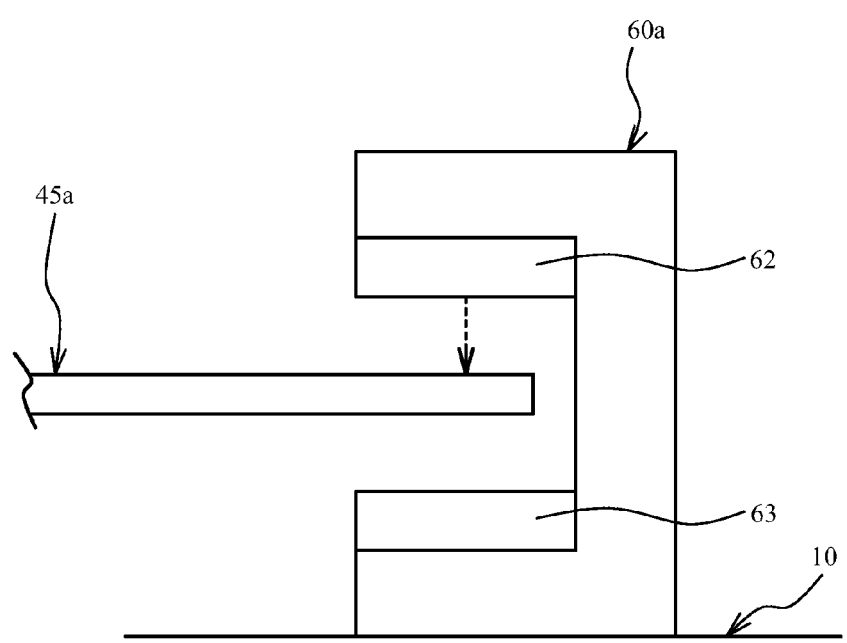

FIGS. 3A and 3B are explanatory views of the sensor 60*a*. The sensor 60*a* is arranged on the board 10. The sensor 60*a* has a light emitting element 62 and a light receiving element 63 that are arranged to face each other. The light receiving element 63 receives the light emitted from the light emitting element 62. As illustrated in FIGS. 3A and 3B, the rotation of the drive lever 55*a* moves the thin plate 45*a* between the light emitting element 62 and the light receiving element 63. When the thin plate 45*a* is located between the light emitting element 62 and the light receiving element 63, the light emitted from the light emitting element 62 is shaded. At this time, whether or not the thin plate 45*a* is positioned between the light emitting element 62 and the light receiving element 63 can be detected based on output signals from the light receiving element 63, thereby detecting the position of the drive lever 55*a*. This can result in detecting the position of the leading shutter 20A. Additionally, the sensor 60*b* and the thin plate 45*b* have the similar configurations.

Additionally, the sensor 60*a* is not limited to the above configuration. For example, the sensor 60*a* may include: a light emitting element; a mirror reflecting the light emitted from the light emitting element; and a light receiving element receiving the light reflected by the mirror. The thin plate 45*a* is positioned between the light emitting element and the mirror, or between the light receiving element and the mirror, thereby detecting the position of the thin plate 45*a*.

Figure 4:
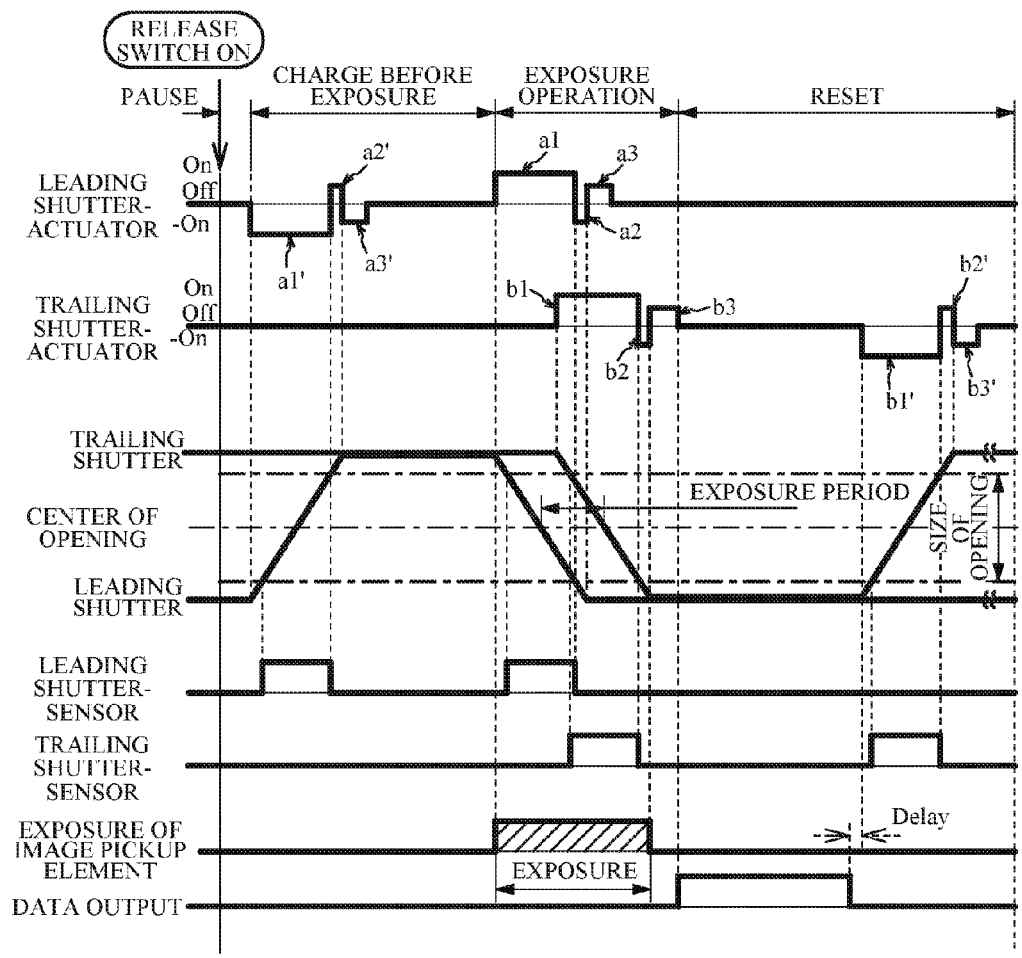
FIG. 4 is a timing chart of a normal operation of the focal plane shutter.

Next, operation of the focal plane shutter 1 will be described. FIG. 4 is a timing chart of a normal operation of the focal plane shutter 1. FIGS. 5 to 11 are explanatory views of the operation of the focal plane shutter 1. Additionally, some parts are omitted in FIGS. 5 to 11.

In a wait state, as illustrated in FIG. 2, the leading shutter 20A and the trailing shutter 20B are positioned at the respective receded positions, and the opening 11 is maintained in the fully opened state. In this state, the thin plate 45*a* recedes from the sensor 60*a*. Likewise, the thin plate 45*b* recedes from the sensor 60*b*. Additionally, output signals of the sensor 60*a* illustrated in FIG. 4 are specifically output signals of the light receiving element 63. When the light from the light emitting element 62 is blocked by the thin plate 45*a*, the light receiving element 63 outputs an H signal to the control portion 110. When receiving the light from the light emitting element 62, the light receiving element 63 outputs an L signal to the control portion 110. The sensor 60*b* has a similar arrangement. Additionally, in the wait state illustrated in FIG. 2, the leading shutter 20A and the trailing shutter 20B are maintained at the respective receded positions where they recede from the opening 11 by the springs described above.

Herein, the output signals from the sensors 60*a* and 60*b* are the L signals output to the control portion 110, and the sensors 60*a* and 60*b* function as sensors for detecting the fully opened state of the opening 11. This function adapts the camera A to the live view mode to show outputs from the image pickup element on a liquid crystal monitor or the like in real time.

When a release switch of the camera A is pushed, a charging operation starts. When the charging operation starts, a coil of the actuator 70*a* is energized such that the leading shutter 20A moves and closes the opening 11. Specifically, the gear 40*a* rotates counterclockwise, and then the gear 50*a* rotates clockwise, which causes the arm 31*a* to drive. Also, the coil of the actuator 70*b* is not energized. Here, the drive lever 55*b* may temporarily come out of contact with the board 10 to perform an operation for suppressing the variations in the exposure period that will be described later. In other words, the trailing shutter 20B may be temporarily moved to the opening 11 by energizing the coil of the actuator 70*b*, and then the trailing shutter 20B may be moved away from the opening 11 by changing the energizing direction of the coil of the actuator 70*b* before the trailing shutter 20B fully closes the opening 11.

Figure 5:
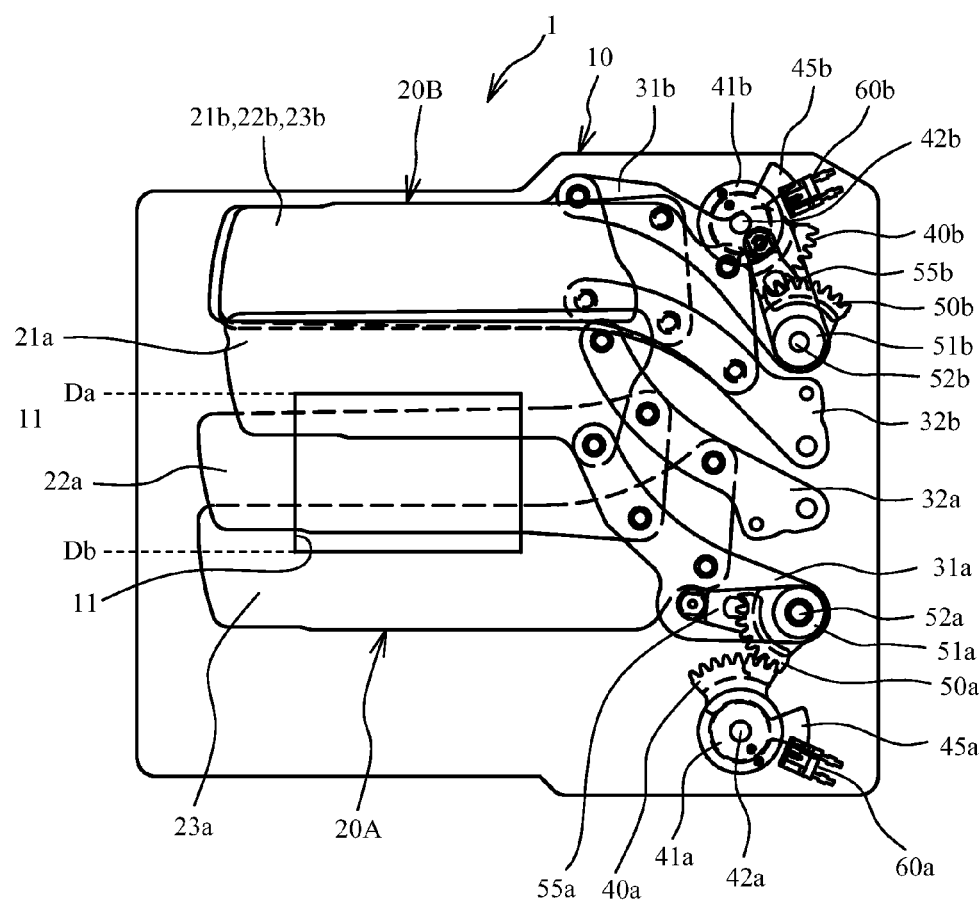
FIG. 5 is an explanatory view of the operation of the focal plane shutter.

After that, the coils of the actuators 70*a* and 70*b* stop being energized in the state where the leading shutter 20A closes the opening 11 and the trailing shutter 20B recedes from the opening 11. In such a way, the charging operation is finished. FIG. 5 illustrates the focal plane shutter 1 in the state where the charging operation is finished. In FIG. 5, the leading shutter 20A is positioned at the closed position, and the trailing shutter 20B is positioned at the receded position. Additionally, as illustrated in FIG. 5, the thin plate 45*a* moves to the sensor 60*a* and moves away therefrom again in the process that the leading shutter 20A is closing the opening 11. Therefore, the output signal from the sensor 60*a* is changed from the L signal into the H signal, and then it is changed into the L signal again.

Figure 6:
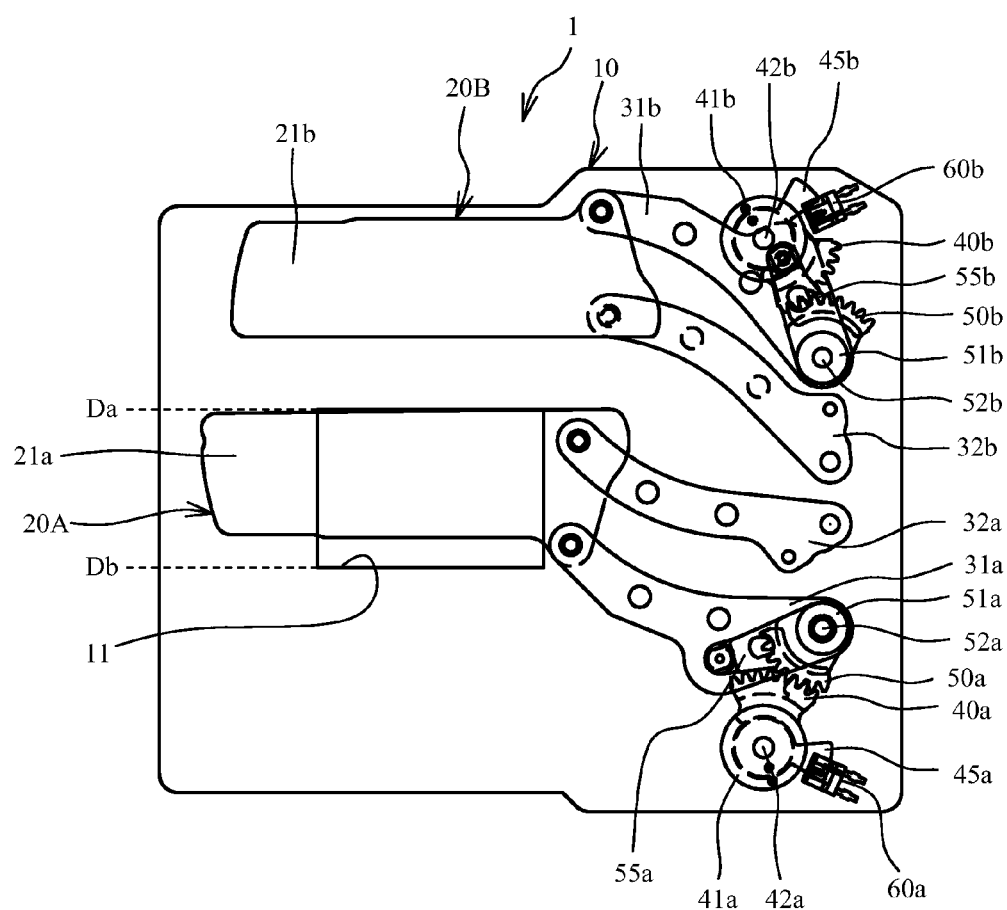
FIG. 6 is an explanatory view of the operation of the focal plane shutter.

After the charging operation is finished, an exposure operation starts. The control portion 110 instructs the drive control portion 170 to energize the coil of the actuator 70*a* such that the leading shutter 20A moves and opens the opening 11. Specifically, the gear 40*a* drives clockwise, and the gear 50*a* drives counterclockwise. In the process that the leading shutter 20A moves away from the opening 11, the thin plate 45*a* moves to the sensor 60*a*. FIG. 6 illustrates a state where the leading shutter 20A is moving. FIG. 6 illustrates the time when the blade 21*a* of the leading shutter 20A passes through a point Da. When the blade 21*a* passes through and moves away from the point Da, so the thin plate 45*a* moves to the sensor 60*a*, and then the output signal from the sensor 60*a* is changed from the L signal into the H signal. In this way, the timing when the output signal from the sensor 60*a* is changed is set to be the timing when the blade 21*a* of the leading shutter 20A passes through the point Da. The control portion 110 detects the change in the output signal from the sensor 60*a*, thereby detecting that the leading shutter 20A passes through the point Da. Additionally, the timing when the output signal from the sensor 60a is changed is not limited to this timing.

Figure 7:
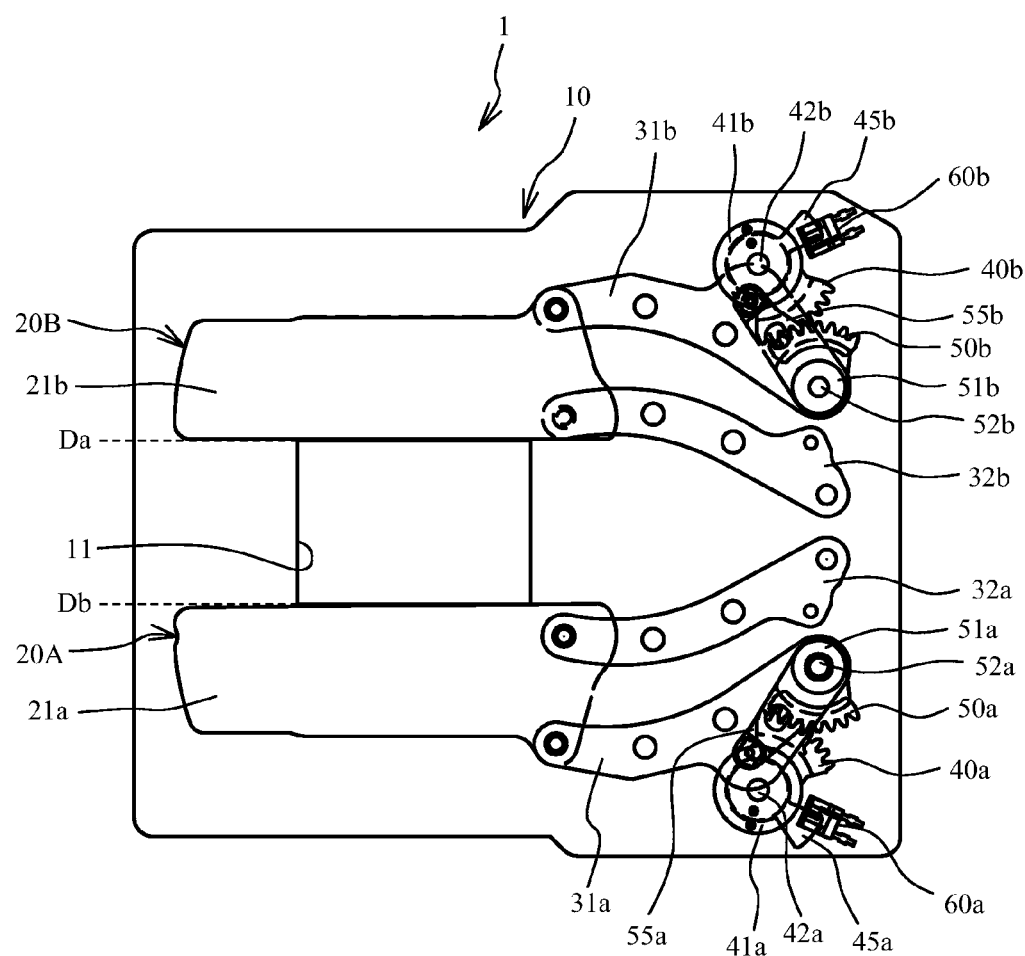
FIG. 7 is an explanatory view of the operation of the focal plane shutter.

After a predetermined period elapse from the time when the control portion 110 detects that the output signal from the sensor 60a is changed from the L signal into the H signal, the control portion 110 energizes the coil of the actuator 70b to start moving the trailing shutter 20B. Thus, the trailing shutter 20B moves to close the opening 11. FIG. 7 illustrates a state where the leading shutter 20A and the trailing shutter 20B are moving. FIG. 7 illustrates when the blade 21a of the leading shutter 20A and the blade 21b of the trailing shutter 20B respectively pass through a point Db and the point Da. When the blade 21a of the leading shutter 20A passes through the point Da and moves away from the point Db, the thin plate 45a moves away from the sensor 60a, and then the output signal from the sensor 60a is changed from the H signal into the L signal. In this way, the timing when the output signal from the sensor 60a is changed is set to be the timing when the blade 21a of the leading shutter 20A passes through the point Db. Further, when the blade 21b of the trailing shutter 20B moves to and passes through the point Da, the thin plate 45b moves to the sensor 60b, and then the output signal from the sensor 60b is changed from the L signal into the H signal. As mentioned above, the timing when the output signal of the sensor 60b is changed is also set to be the timing when the blade 21b of the trailing shutter 20B passes through the point Da.

Figure 8:
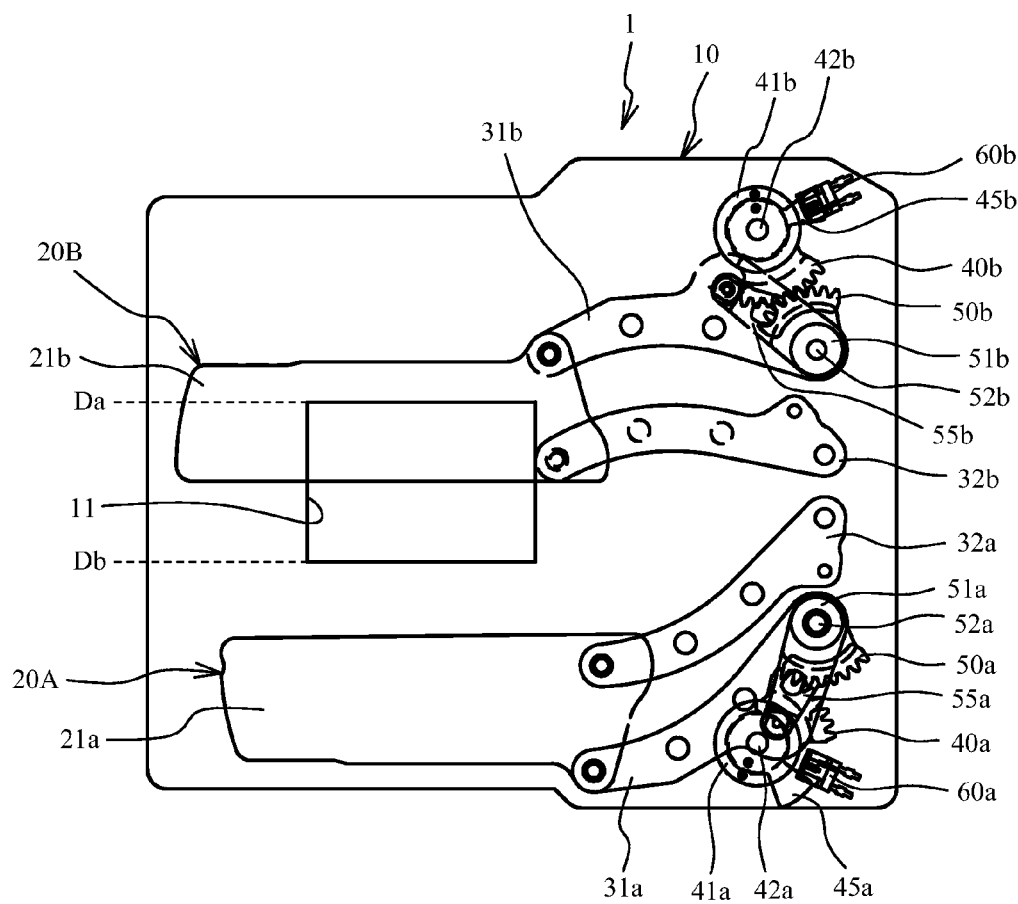
FIG. 8 is an explanatory view of the operation of the focal plane shutter.
Figure 9:
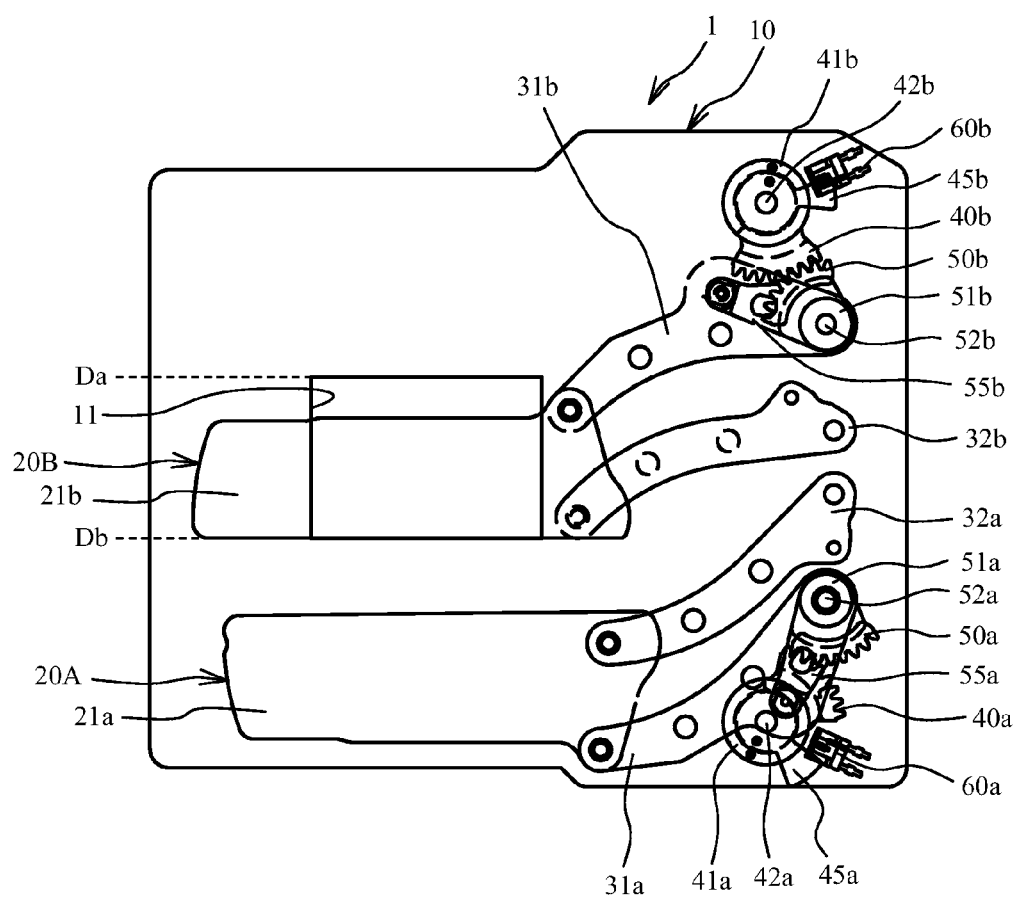
FIG. 9 is an explanatory view of the operation of the focal plane shutter.
Figure 10:
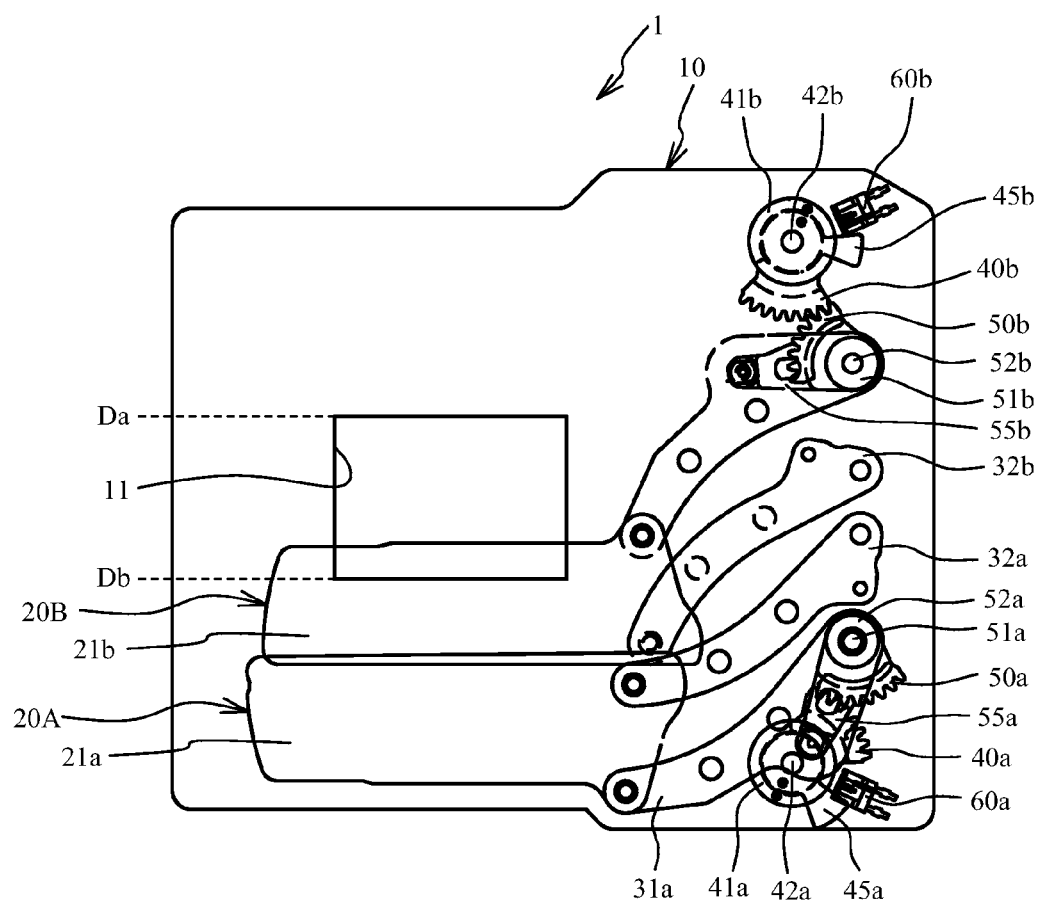
FIG. 10 is an explanatory view of the operation of the focal plane shutter.

FIG. 8 illustrates the leading shutter 20A that finishes moving and the trailing shutter 20B that is moving. FIG. 9 illustrates when the blade 21b of the trailing shutter 20B passes through the point Db. When the blade 21b of the trailing shutter 20B passes through the point Db, the thin plate 45b moves away from the sensor 60b, and then the output signal from the sensor 60b is changed from the H signal into the L signal. FIG. 10 illustrates a state after the leading shutter 20A and the trailing shutter 20B stop to finish the exposure operation. When the leading shutter 20A fully recedes from the opening 11 and the trailing shutter 20B fully closes the opening 11, the coils of the actuators 70a and 70b stop being energized. FIG. 10 illustrates a state where the leading shutter 20A is in the receded position and the trailing shutter 20B is in the closed position. The exposure operation is finished in this way. Herein, in the center of the frame in the movable directions of the leading shutter 20A and the trailing shutter 20B, a period from the time when the leading shutter 20A starts moving to open the opening 11 to the time when the trailing shutter 20B closes the opening 11 is referred to as an exposure period.

Figure 11:
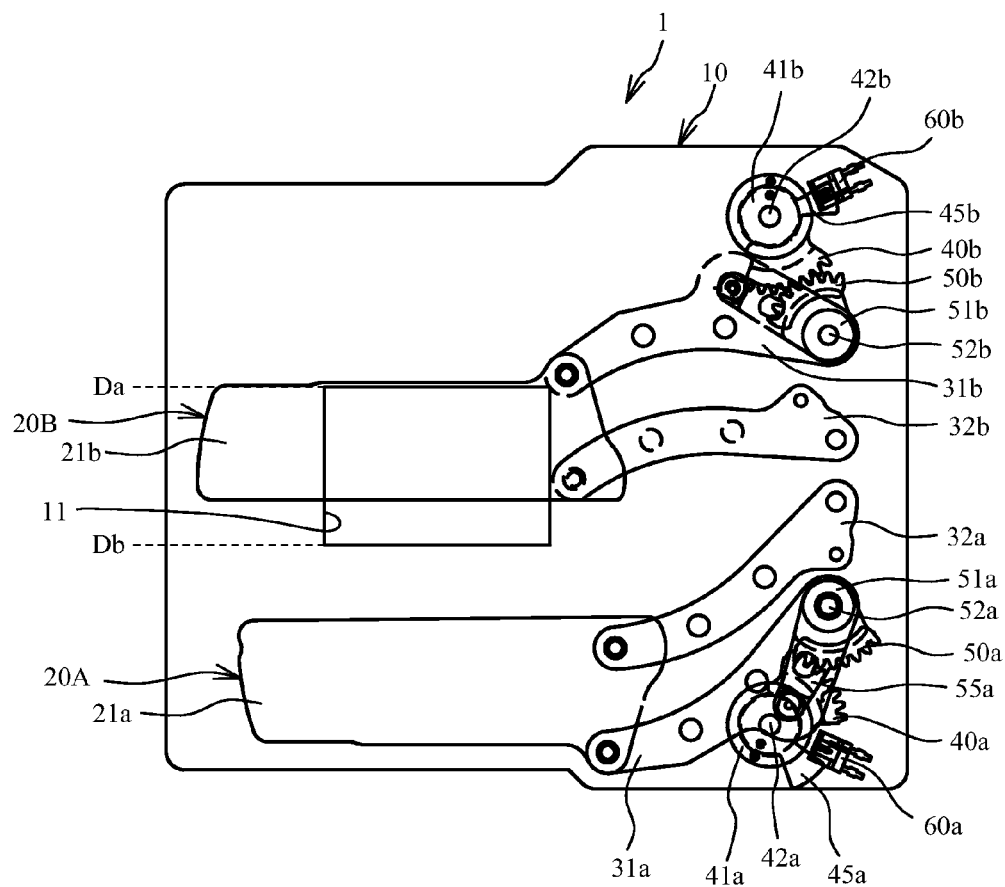
FIG. 11 is an explanatory view of the operation of the focal plane shutter.

After the exposure operation is finished, the data are output to a RAM of the control portion 110 or a memory of the camera. Next, the coil of the actuator 70b is energized, so that the trailing shutter 20B moves away from the opening 11 as illustrated in FIG. 11, which maintains the opening 11 in the fully opened state, whereby the state returns to an initial state illustrated in FIG. 2.

Next, a description will be given of the control of the actuators 70a and 70b performed by the drive control portion 170 in the exposure operation with reference to FIG. 4. In order to start the exposure operation from the state illustrated in FIG. 5, the drive control portion 170 performs movement control to move the leading shutter 20A away from the opening 11 by applying electric power to the actuator 70a (a1). Next, when the passage of the blade 21a of the leading shutter 20A through the point Db is detected based on the change in the output signal from the sensor 60a, the drive control portion 170 performs brake control (a2). Specifically, the drive control portion 170 energizes the actuator 70a in the direction opposite to the direction of the current applied thereto in the above movement control. Therefore, the leading shutter 20A is decelerated after passing through the point Db. Accordingly, the leading shutter 20A can be suppressed from bounding when stopping.

Next, while the leading shutter 20A is bounding, the drive control portion 170 performs bounce prevention control (a3). Specifically, the drive control portion 170 energizes the actuator 70a in the direction same as the direction of the current applied thereto in the movement control. This suppresses the leading shutter 20A from bounding away from the desired predetermined position. Additionally, the value of the current applied to the actuator 70a in the bounce prevention control is smaller than that of the current applied thereto in the movement control, but is not limited to this.

Likewise, when the passage of the blade 21b of the trailing shutter 20B through the point Db is detected while the movement control (b1) is performed to move the trailing shutter 20B, the drive control portion 170 performs the brake control for the actuator 70b (b2), and then performs the bounce prevention control (b3). This suppresses the bounce of the trailing shutter 20B. The above control performed by the drive control portion 170 can suppress the bounces of the leading shutter 20A and the trailing shutter 20B caused by stopping them, thereby shortening the period while the leading shutter 20A or the trailing shutter 20B is bounding. This makes it possible to immediately activate the leading shutter 20A and the trailing shutter 20B for the next operation. For example, in this case, the reset operation can be shifted immediately after the exposure operation is finished.

In this way, when the leading shutter 20A moves away from the opening 11 and the trailing shutter 20B moves to close the opening 11 in the exposure operation, the leading shutter 20A and the trailing shutter 20B are decelerated based on whether or not the blades 21a and 21b pass through the point Db but not the point Da. In this case, the point Db is closer to the stop positions of the blades 21a and 21b than to the start positions thereof. Since the leading shutter 20A and the trailing shutter 20B are decelerated after the blades 21a and 21b pass through the point Db close to the respective stop positions, the leading shutter 20A and the trailing shutter 20B can be suppressed from bounding without influencing each speed at which the leading shutter 20A and the trailing shutter 20B move over the opening 11, that is, without influencing the exposure period of the image pickup element 130. In addition, the movement direction in which the leading shutter 20A moves away from the opening 11, and the movement direction in which the trailing shutter 20B moves to close the opening 11 correspond to a first direction. The point Db corresponds to a first predetermined position.

Further, during the charging operation, the drive control portion 170 performs the movement control to move the leading shutter 20A to close the opening 11 (a1'). When it is detected that the blade 21a of the leading shutter 20A passes through the point Da, the drive control portion 170 performs the brake control (a2'), and then performs the bounce prevention control (a3'). Further, during the reset operation, the drive control portion 170 performs the movement control to move the trailing shutter 20B away from the opening 11 (b1'). When it is detected that the blade 21b of the trailing shutter 20B passes through the point Db, the drive control portion 170 performs the brake control (b2'), and then performs the bounce prevention control (b3'). In addition, the energizing directions of the actuators 70a and 70b during the charging operation and the reset operation are opposite to the energizing directions during the exposure operation.

In this way, even during the charging operation and the reset operation, the leading shutter 20A and the trailing shutter 20B are suppressed from bounding. It is thus possible to finish the charging operation and the reset operation in short time, so the next operation can be shifted immediately.

When the leading shutter 20A moves to close the opening 11 in the charging operation, the leading shutter 20A is decelerated based on whether or not the blade 21a passes through the point Da but not the point Db. When the trailing shutter 20B moves away from the opening 11 in the reset operation, the trailing shutter 20B is decelerated based on whether or not the blade 21b passes through the point Da but not the point Db. In these cases, the point Da is closer to the stop positions of the blades 21a and 21b than to the start positions thereof. The leading shutter 20A and the trailing shutter 20B are decelerated after the blades 21a and 21b pass through the point Da close to the stop positions, respectively. This can suppress the bounces while the movement speeds of the leading shutter 20A and the trailing shutter 20B are ensured. It is therefore possible to finish the charging operation and the reset operation in short time. In addition, the movement direction in which the leading shutter 20A moves to close the opening 11, and the movement direction in which the trailing shutter 20B moves away from the opening 11 correspond to a second direction. The point Da corresponds to a second predetermined position.

Further, since the leading shutter 20A and the trailing shutter 20B are decelerated in the moving states to be stopped, this can suppress the impact on the board 10, the leading shutter 20A, the trailing shutter 20B, and the like, thus improving the durability of the focal plane shutter 1.

Furthermore, the leading shutter 20A and the trailing shutter 20B are suppressed from warping when bounding. In particular, when the leading shutter 20A and the trailing shutter 20B stop after shifting from the overlapped states to the expanded states, the leading shutter 20A and the trailing shutter 20B tend to be warped. If the expanded leading shutter 20A and the expanded trailing shutter 20B are warped, the leading shutter 20A and the trailing shutter 20B may project from the opening 11 and abut the image pickup element 130 adjacent to the focal plane shutter 1. In the present embodiment, the leading shutter 20A and the trailing shutter 20B are suppressed from bounding when stopping after shifting to the expanded states, thus suppressing such a problem.

The leading shutter 20A and the trailing shutter 20B are suppressed from warping, so the thin blades 21a to 23a and the thin blades 21b to 23b can be employed, which can reduce the leading shutter 20A and the trailing shutter 20B in their thicknesses. It is thus possible to employ the actuators 70a and 70b with low output power, so the focal plane shutter 1 can be reduced in its weight.

For example, in either case where the passage of the blade 21a through the point Da close to its stop position is detected twice within a predetermined period after the leading shutter 20A starts moving to close the opening 11 or where the passage of the blade 21b through the point Da close to its stop position is detected twice within a predetermined period after the trailing shutter 20B starts moving away from the opening 11, the control portion 110 may determine the malfunction of the focal plane shutter 1 because of the malfunction state of the leading shutter 20A or the trailing shutter 20B. Likewise, in either case where the passage of the blade 21a through the point Db close to its stop position is detected twice within a predetermined period after the leading shutter 20A starts moving to close the opening 11, where the passage of the blade 21b through the point Db close to its stop position is detected twice within a predetermined period after the trailing shutter 20B starts moving to close the opening 11, or where the passage of the blade 21b through the point Da close to its stop position is detected twice within a predetermined period after the trailing shutter 20B starts moving away from the opening 11, the control portion 110 may determine the malfunction of the focal plane shutter 1 because of the malfunction state where the leading shutter 20A or the trailing shutter 20B bounds or where the re-exposure occurs.

Figure 12:
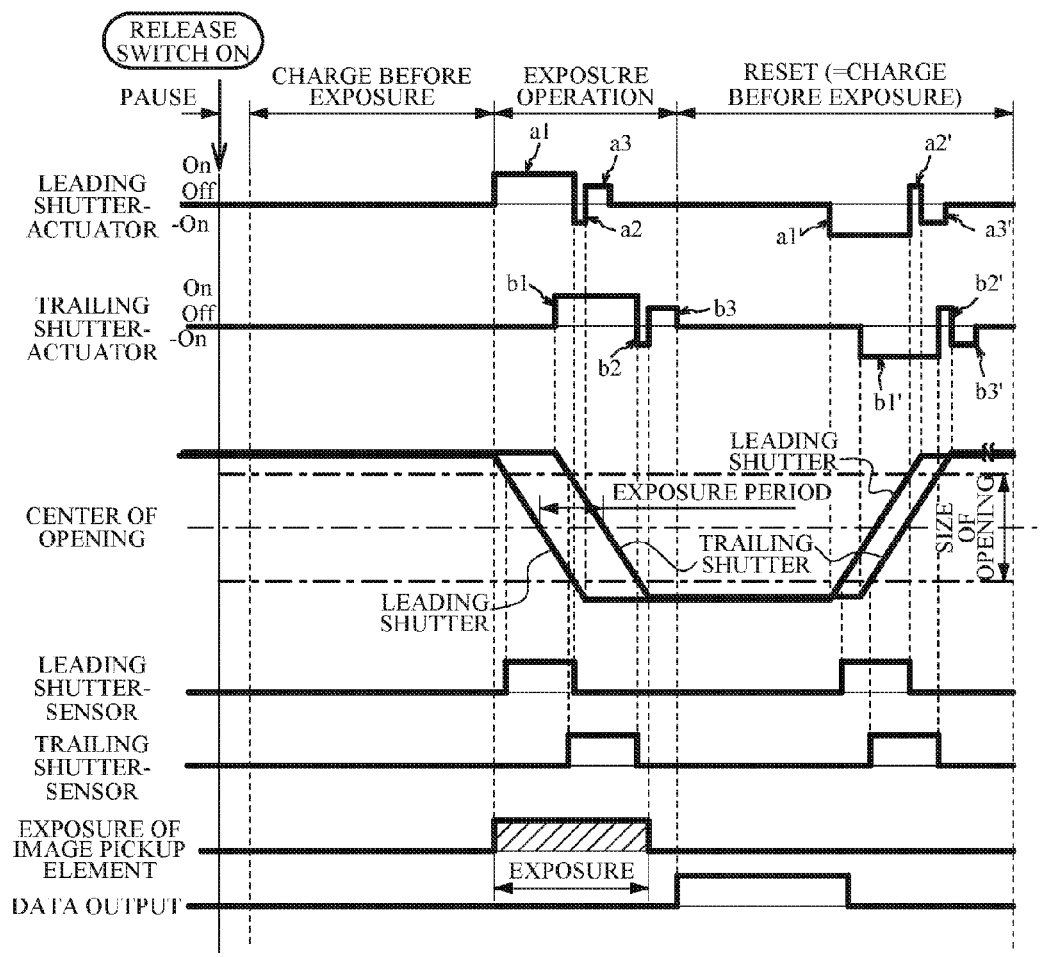
FIG. 12 is a timing chart of a continuous shooting operation of the focal plane shutter.
Figure 13:
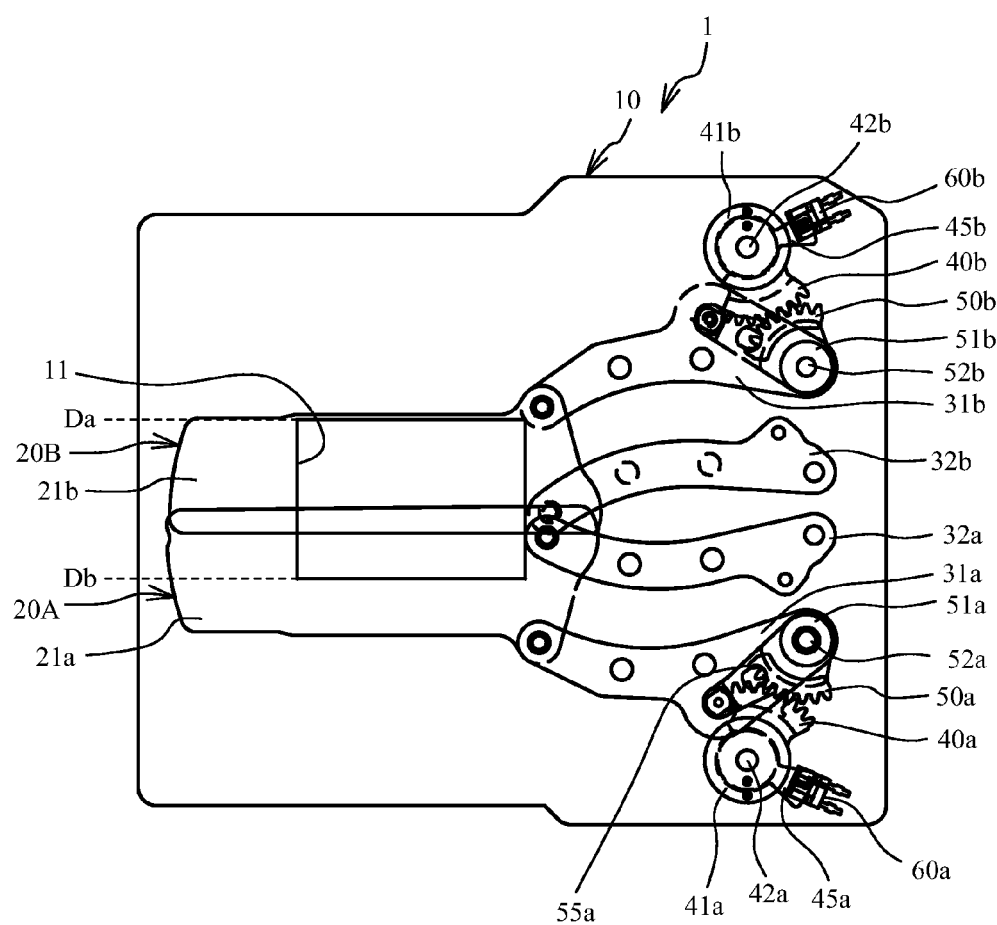
FIG. 13 is an explanatory view of the continuous shooting operation of the focal plane shutter.

Next, a description will be given of the continuous shooting operation of the focal plane shutter 1. FIG. 12 is a timing chart of the continuous shooting operation of the focal plane shutter 1. When the release switch is pushed in the state where the leading shutter 20A closes the opening 11 and the trailing shutter 20B recedes from the opening 11, the exposure operation is performed as illustrated in FIGS. 5 to 10. After the exposure operation is finished, the leading shutter 20A starts moving in such a direction as to close the opening 11 ahead of the trailing shutter 20B. After the blade 21a passes through the point Db, the trailing shutter 20B starts moving away from the opening 11. Thus, as illustrated in FIG. 13, the reset operation is performed such that the leading shutter 20A closes the opening 11 and the trailing shutter 20B moves away from the opening 11 in the state where the leading shutter 20A and the trailing shutter 20B cooperatively close the opening 11. In this reset operation, like the above mentioned charging operation of the leading shutter 20A and reset operation of the trailing shutter 20B, the drive control portion 170 performs the brake control (a2', b2') and the bounce prevention control (a3', b3'). After that, the exposure operation is performed again. Even in the continuous shooting operation, the bounces of the leading shutter 20A and the trailing shutter 20B are suppressed in the above manner, so the continuous shooting speed is improved.

Also, in the continuous shooting operation, the leading shutter 20A precedingly moves in the state where the leading shutter 20A closes the opening 11 and the trailing shutter 20B recedes from the opening 11, and then the trailing shutter 20B moves. In this way, the exposure operation is performed, but not limited. For example, after the first exposure operation is performed such that the leading shutter 20A opens the opening 11 and then the trailing shutter 20B closes the opening 11, the second exposure operation may be performed such that the trailing shutter 20B precedingly opens the opening 11 and then the leading shutter 20A closes the opening 11.

Further, in the above embodiment, the brake control energizes the actuators 70a and 70b in the direction opposite to the energizing direction of the movement control, but is not limited. For example, the brake control may be shortbrake to short-circuit the terminals of the actuators 70a and 70b. Alternately, the brake control may make the electric power supplied to the actuators 70a and 70b smaller than that in the movement control.

Furthermore, in a case where the brake control itself adequately prevents the leading shutter 20A and the trailing shutter 20B from bounding, the bounce prevention control may not be performed.

In the above embodiment, when the blades 21a and 21b pass through the points Da and Db of the positions of the edges of the opening 11, the output signals from the sensors 60a and 60b are changed to perform the brake control, respectively. However, this is not limited. For example, when the blades 21a and 21b pass through an edge of the image pickup element 130, the output signals from the sensors 60a and 60b may be changed, respectively. Alternately, when the blades 21a and 21b pass through a position other than the above positions, the output signals from the sensors 60a and 60b may be changed, respectively. Moreover, after a short period elapses from the time when the output signals from the sensors 60a and 60b are changed, the brake control may be performed.

A sensor for detecting the passage of the leading shutter 20A through a predetermined position is not limited to the sensor 60a. For example, it may be a switch that is pushed by any one of the arms 31a and 32a, the drive lever 55a, and the gears 50a and 40a. The sensor 60a may be a photo-interrupter or a photo-reflector.

While the exemplary embodiments of the present invention have been illustrated in detail, the present invention is not limited to the above-mentioned embodiments, and other embodiments, variations and modifications may be made without departing from the scope of the present invention.

The control portion 110 and the drive control portion 170 may be achieved by a single IC chip.

In the above embodiment, the leading shutter and the trailing shutter are each composed of three blades, but they are not limited.

Finally, several aspects of the present invention are summarized as follows.

According to an aspect of the present invention, there is provided an image pickup device including: a focal plane shutter including: a board including an opening; a shutter moving to open and close the opening; an actuator moving the shutter; and a detection portion detecting that the shutter passes through a predetermined position, an image pickup element which light enters through the opening; and a drive control portion that controls the actuator to move the shutter, wherein the drive control portion performs movement control to move the shutter at least until the shutter passes through the predetermined position, and performs brake control to decelerate the shutter while the shutter is moving after the shutter passes through the predetermined position. The shutter is moving and is decelerated after passing through the predetermined position, whereby the bounce caused by stopping the shutter is suppressed.

According to another aspect of the present invention, there is provided a focal plane shutter including: a board including an opening; a shutter moving to open and close the opening; an actuator moving the shutter; and a detection portion detecting that the shutter passes through a predetermined position, wherein movement control to move the shutter is performed for the actuator at least until the shutter passes through the predetermined position, and brake control to decelerate the shutter is performed for the actuator while the shutter is moving after the shutter passes through the predetermined position.

What is claimed is:

1. An image pickup device comprising:
a focal plane shutter including:
a board including an opening;
a shutter moving to open and close the opening;
an actuator moving the shutter; and
a detection portion detecting that the shutter passes through a predetermined position;
an image pickup element which light enters through the opening; and
a drive control portion configured to control the actuator to move the shutter,
wherein the drive control portion is configured to perform movement control to move the shutter at least until the shutter passes through the predetermined position by energizing the actuator in an energizing direction, performs brake control to decelerate the shutter while the shutter is moving after the shutter passes through the predetermined position, and, after performs brake control, performs bounce suppression control by energizing the actuator in an energizing direction that is the same direction as the energizing direction in the movement control.

2. The image pickup device of claim 1,
wherein electric power is supplied to the actuator in the movement control, and
wherein the brake control includes at least one of changing an energizing direction of the actuator, short-circuiting terminals of the actuator, and making an amount of electric power supplied to the actuator smaller than that of the electric power in the movement control.

3. The image pickup device of claim 1, wherein the predetermined position is a position closer to a stop position than to a start position between the start position and the stop position in a movable range of the shutter.

4. The image pickup device of claim 1, wherein
the shutter includes plural blades and is capable of shifting between an overlapped state where the plural blades overlap each other and recede from the opening and an expanded state where the plural blades are expanded and close the opening,
the drive control portion performs the brake control while the shutter is moving from the overlapped state to the expanded state.

5. The image pickup device of claim 1, wherein
the actuator moves the shutter in first and second directions opposite to each other to open and close the opening,
the predetermined position includes different first and second positions,
the brake control includes:
first brake control to decelerate the shutter while the shutter is moving in the first direction after the shutter passes through the first predetermined position, and
second brake control to decelerate the shutter while the shutter is moving in the second direction after the shutter passes through the second predetermined position.

6. The image pickup device of claim 1,
wherein electric power is supplied to the actuator in performing the movement control, and
wherein an amount of electric power supplied to the actuator in performing the bounce suppression control is lower than that of the electric power supplied to the actuator in performing the movement control.

7. The image pickup device of claim 1, comprising a control portion configured to determine that the shutter is in a malfunction state, when passage of the shutter through the predetermined position is detected, twice or more within a predetermined period, by the detection portion.

8. A focal plane shutter comprising:
a board including an opening;
a shutter moving to open and close the opening;
an actuator moving the shutter; and
wherein movement control on the actuator to move the shutter is performed at least until the shutter passes through the predetermined position by energizing the actuator in an energizing direction, brake control on the actuator to decelerate the shutter while the shutter is moving after the shutter passes through the predetermined position, and bounce suppression control on the actuator after the brake control by energizing the actuator in an energizing direction that is the same direction as the energizing direction in the movement control.

* * * * *